(12) United States Patent
Yalla

(10) Patent No.: US 10,527,440 B2
(45) Date of Patent: Jan. 7, 2020

(54) VEHICLE ROUTING TO AVOID REGIONS WITH GLARE

(71) Applicant: Faraday&Future Inc., Gardena, CA (US)

(72) Inventor: Veera Ganesh Yalla, Sunnyvale, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 0 days.

(21) Appl. No.: 15/659,986

(22) Filed: Jul. 26, 2017

(65) Prior Publication Data

US 2018/0164107 A1    Jun. 14, 2018

Related U.S. Application Data

(60) Provisional application No. 62/367,562, filed on Jul. 27, 2016.

(51) Int. Cl.
| | | |
|---|---|---|
| *G01C 21/34* | (2006.01) | |
| *G01C 21/36* | (2006.01) | |
| *B60W 40/02* | (2006.01) | |
| *G06K 9/00* | (2006.01) | |

(52) U.S. Cl.
CPC ......... *G01C 21/3461* (2013.01); *B60W 40/02* (2013.01); *G01C 21/3602* (2013.01); *G01C 21/3691* (2013.01); *G06K 9/00791* (2013.01); *B60W 2420/42* (2013.01); *B60W 2550/12* (2013.01)

(58) Field of Classification Search
CPC ............ G01C 21/3461; G01C 21/3602; G01C 21/3691; B60W 40/02; B60W 2420/42; B60W 2550/12; G06K 9/00791
See application file for complete search history.

(56) References Cited

U.S. PATENT DOCUMENTS

| | | | | |
|---|---|---|---|---|
| 8,841,592 | B1 * | 9/2014 | Ho | F24S 40/00 |
| | | | | 250/203.4 |
| 9,448,449 | B2 * | 9/2016 | Ramanathan | B60R 1/088 |
| 10,222,229 | B1 * | 3/2019 | Shum | G01C 21/3697 |
| 2009/0168185 | A1 * | 7/2009 | Augustine | B60J 3/04 |
| | | | | 359/613 |
| 2010/0094501 | A1 * | 4/2010 | Kwok | G02B 27/01 |
| | | | | 701/36 |
| 2011/0077855 | A1 * | 3/2011 | Sumizawa | G08G 1/096888 |
| | | | | 701/533 |
| 2011/0249251 | A1 * | 10/2011 | Lynch | G01C 21/32 |
| | | | | 356/5.01 |

(Continued)

*Primary Examiner* — Calvin Cheung
(74) *Attorney, Agent, or Firm* — Veros Legal Solutions, LLP

(57) ABSTRACT

Features of a vehicle navigation system are discussed in this disclosure. In particular, systems and methods for identifying glare-prone areas and establishing a route that avoids one or more of the identified glare-prone areas that are determined to be likely to degrade visibility of an environment outside of the vehicle. In some embodiments, the navigation system can be configured to calculate the likely duration of a trip and then based on sun angle data identify locations where glare is likely to be problematic. In some embodiments, the navigation system can also be configured to choose routes that avoid bright sources of light that could adversely affect visual acuity at night.

17 Claims, 9 Drawing Sheets

(56) References Cited

U.S. PATENT DOCUMENTS

| | | | |
|---|---|---|---|
| 2013/0218449 A1* | 8/2013 | Hymel | G01C 21/3461 |
| | | | 701/408 |
| 2017/0138744 A1* | 5/2017 | Jaquinta | G01C 21/3415 |
| 2018/0053415 A1* | 2/2018 | Krunic | G08G 1/096775 |
| 2018/0080785 A1* | 3/2018 | Han | B60W 50/0098 |
| 2018/0089516 A1* | 3/2018 | Govindasamy | B60J 3/04 |
| 2018/0210466 A1* | 7/2018 | Weaver | G05D 1/104 |
| 2018/0304727 A1* | 10/2018 | Choi | B60J 3/04 |

* cited by examiner

VEHICLE ROUTING TO AVOID REGIONS WITH GLARE

CROSS-REFERENCE TO RELATED APPLICATIONS

This application claims the benefit of U.S. Provisional Application No. 62/367,562, filed Jul. 27, 2016, the entirety of which is hereby incorporated by reference.

BACKGROUND

Glare can present a serious safety issue when travelling in any vehicle. Even autonomous driving systems can be substantially degraded by strong sources of light incident to one or more of their sensors. Glare generated by the sun can be particularly dangerous during the periods before sunset and after sunrise. Even when the sun is not visible through the front windshield of the vehicle, glare can reflect off the dashboard. When the sun is behind the vehicle, glare can reduce the effectiveness of the rear-view mirrors or in some cases obscure the driver's view of traffic signals. This phenomenon is even more problematic due to the heaviest sun glare periods coinciding with morning and evening commute times when traffic is often the heaviest. For these reasons, a way to mitigate glare tending to prevent a sensor or driver from seeing clearly outside of the vehicle is desirable.

SUMMARY

A vehicle is disclosed and includes a navigation system configured to identify one or more glare-prone portions of a first route of travel in which at least one light source is predicted to degrade visibility of an environment outside of the vehicle. The prediction can be based on light source position information and predicted position and orientation of the vehicle along the first route of travel. The vehicle navigation system can also be configured to establish a second route of travel that avoids at least a part of an identified glare-prone portion of the first route of travel.

A method for navigating a vehicle is disclosed and includes identifying one or more glare-prone portions of a first route in which the sun is predicted to degrade visibility of an environment outside of the vehicle. The prediction is based on at least sun position information and predicted position and orientation of the vehicle along the first route. The method also includes establishing a second route that avoids at least a part of an identified glare-prone portion of the first route.

Another vehicle is disclosed and includes a processor. The processor is configured to execute a non-transitory computer-readable storage medium containing instructions that cause the processor to perform operations that include receiving a request to navigate the vehicle to a destination. After the destination is selected, the processor determines a first route between a current location of the vehicle and the destination and predicts an estimated time of arrival at the destination. The processor also identifies one or more glare-prone portions of the first route in which one or more light sources are predicted to degrade visibility of an environment outside of the vehicle. The predication is based on at least light source position information and predicted position and orientation of the vehicle along the first route. Finally, the process is configured to establish a second route that avoids at least a part of an identified glare-prone portion of the first route.

BRIEF DESCRIPTION OF THE DRAWINGS

The disclosure will be readily understood by the following detailed description in conjunction with the accompanying drawings, wherein like reference numerals designate like structural elements, and in which.

Figure 1:
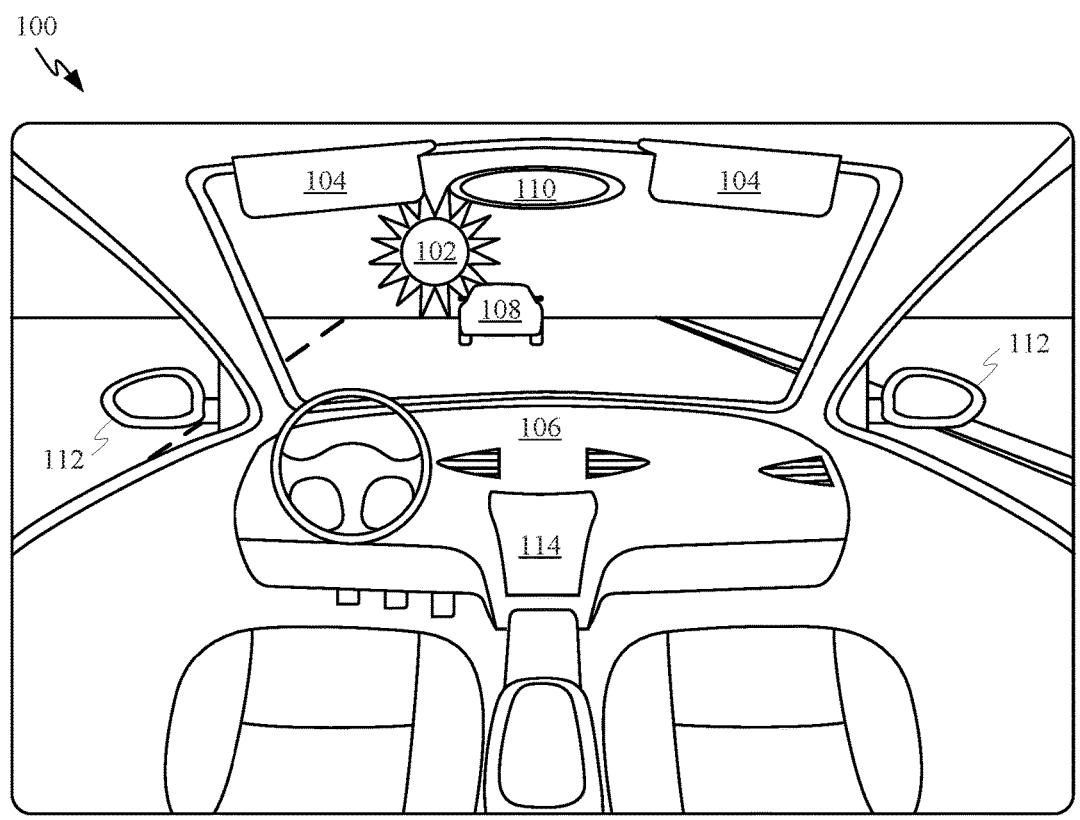
FIG. 1 shows an interior view of a vehicle travelling along a paved road directly towards the sun.

Other aspects and advantages of the invention will become apparent from the following detailed description taken in conjunction with the accompanying drawings which illustrate, by way of example, the principles of the described embodiments.

DETAILED DESCRIPTION

This description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the invention is not limited to the embodiments shown, but is to be accorded the widest scope consistent with the principles and features disclosed herein.

Bright lights shining through the front windshield of a vehicle can cause severe driver discomfort and can be potentially deadly when the lights prevent a driver of the vehicle from seeing potential hazards. In some cases, bright light can be emitted by the sun and generate glare that prevents a driver from being able to properly see important elements of the vehicle's surroundings, such as a pedestrian, another vehicle, signage on the road, the colors being displayed by a traffic signal, etc. Unfortunately, vehicle navigation systems generally route vehicles along the most direct or fastest route to get to a final destination without taking into consideration environmental factors that can result in severe visibility limitations due to glare.

According to certain embodiments, predicted glare data is factored into navigational route computation when the navigation system determines glare is likely to be an issue during one or more segments of the navigational route. Glare data can be predicted in various ways. In one embodiment, sun-position information associated with portions of a route may be obtained. While conducting calculations for one specific route is possible, the term route can also refer broadly to an area between a current position and a destination. Consequently, the methods described herein can also be carried out by identifying any glare-prone areas between the current position and destination. The sun position information may comprise, for example, sun-angle information.

In some embodiments, three dimensional maps data can also be retrieved and combined with the sun-position information to identify shadowed areas. Once the glare data is retrieved it can be used to identify alternate routing when the fastest or most direct routes are determined to have substantial amounts of sun glare.

In some embodiments, vehicle specific factors can be factored into choice of routing. For example, a vehicle with a low roofline would be less likely to suffer the effects of sun glare than a similarly positioned vehicle with a higher roofline. The angle, curvature and tint of the front windshield can also substantially alter the effect of sun glare on the driver. In some cases, the size and position of a sunshade could also be taken into account when establishing a vehicle route based on sun glare data.

In some embodiments, the driver's physiological attributes can be considered. For example, a taller driver tends to have a lower likelihood of being bothered by the sun than a shorter driver on account of the visor and roof of the car being more likely to shade the driver's eyes from the sun.

It should be noted that in certain circumstances sun determination could be omitted from route determination. For example, sun position determination could be performed only during hours where the sun was known to be within a predetermined distance from the horizon. Further, sun position determination could also be skipped on overcast days.

These and other embodiments are discussed below with reference to FIGS. 1-7; however, those skilled in the art will readily appreciate that the detailed description given herein with respect to these figures is for explanatory purposes only and should not be construed as limiting.

FIG. 1 shows an interior view of a vehicle 100 travelling along a paved road directly towards the sun 102. Vehicle 100 includes sunshades 104, which can be helpful in obscuring sun 102 from a driver's field of view when sun 102 is sufficiently elevated above the horizon. However, even when sun 102 is positioned outside of a driver's direct field of view, a low angle of light direction can allow light to enter the windshield and bounce off dashboard 106. Light bouncing off dashboard 106 is particularly likely when dashboard 106 has a light color and/or reflective texture. For at least this reason, it can be advisable to employ glare mitigation even when the sun is not visible within the front windshield of a vehicle. Glare can even affect the driver of vehicle 100 when sun 102 is located behind vehicle 100 and light from the sun reflects off mirrors 110 or 112. In some embodiments, sunlight emitted from sun 102 when it is positioned behind vehicle 100 can reflect off the taillights of vehicle 108, e.g., making it unclear as to whether or not vehicle 108 intends to stop. Sunlight can also reflect off and obscure the state of other important signals such as traffic lights. Vehicle 100 can also include display 114, which can be used to display imagery from a car-mounted camera. In some embodiments, imagery from the camera can help a driver identify high contrast scenes. For example, high dynamic range photos or video clips can be used to overcome the high contrast scenes caused by the presence of sun 102 near the horizon. Alternatively, when the camera feeding imagery to display 114 is offset far enough from the driver, the sun glare may not have as substantial an impact.

FIG. 1 also shows that when sun 102 is positioned within a viewable portion of the front windshield of vehicle 100, as depicted, it can become extremely difficult for a driver of vehicle 100 to see through the front windshield, which can make driving safely difficult if not impossible. While some methods of mitigating this problem such as sunshades 104 and polarized sunglasses have been in general use for some time, mitigating the effects of the sun when it happens to be directly in front of the car can be challenging. As depicted, the position of vehicle 108 adjacent to sun 102 can make vehicle 108 very difficult to see for the driver of vehicle 100. Consequently, a driver of vehicle 100 might not be able to react quickly enough if vehicle 108 stopped rapidly due to a crash or sudden slowdown in traffic.

Figure 2A:
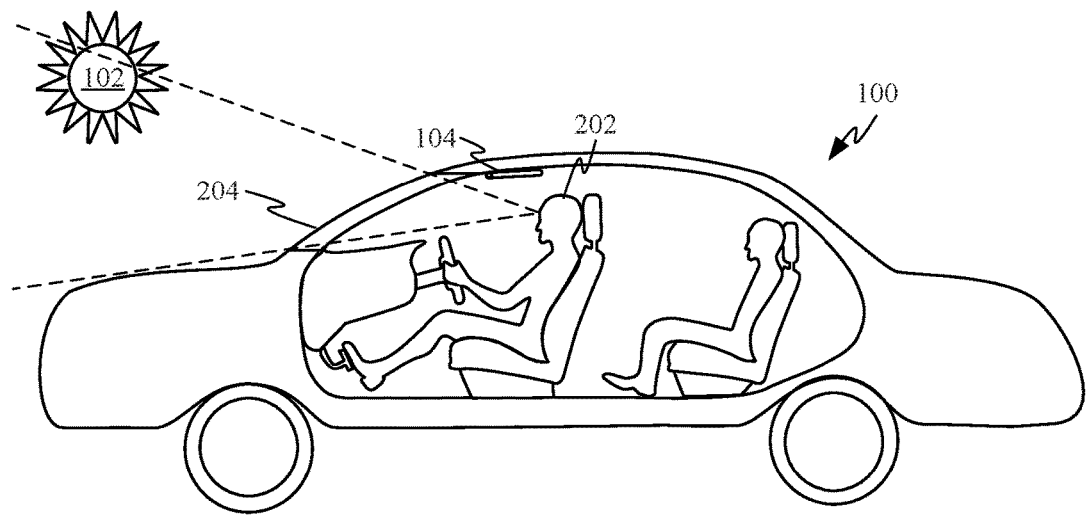
FIGS. 2A-2D show how the height of a driver and configuration of a vehicle affect the elevation below which the sun has the potential to come into direct view of a driver of a vehicle.
Figure 2B:
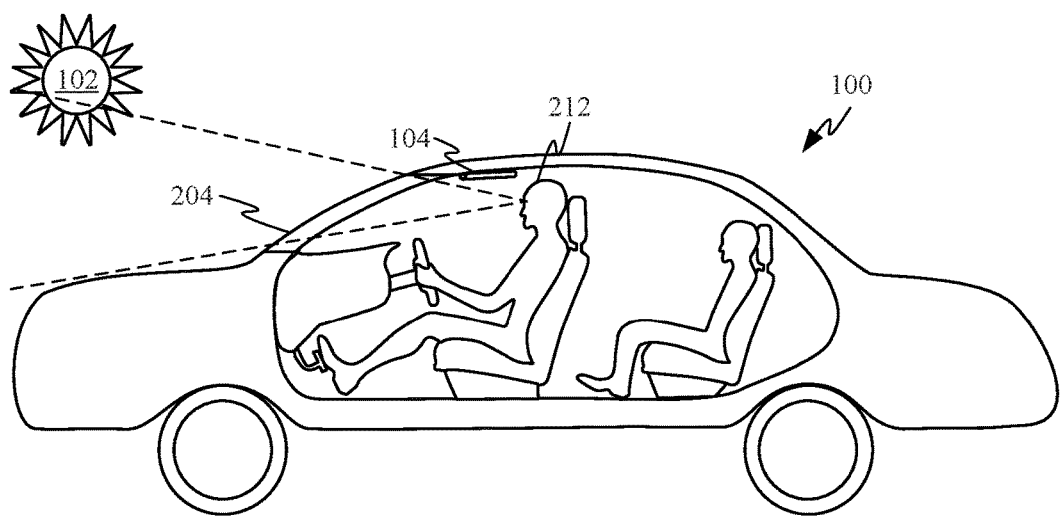

FIGS. 2A-2D show how the height of a driver and configuration of a vehicle may affect the elevation below which the sun has the potential to come into direct view of the driver of the vehicle. FIGS. 2A and 2B show the same cars with different drivers 202 and 212 with sunshades 104 in a stowed position. Because driver 212 as depicted in FIG. 2B has a greater sitting height and longer legs than driver 202 depicted in FIG. 2A, driver 212 is positioned farther from the front windshield 204 than driver 202 and the head of driver 212 is positioned higher in the cabin of vehicle 100 than the head of driver 202. Both the rearwards positioning of driver 212 and the higher position of the head of driver 212 reduces the threshold elevation at which sun 102 comes into direct view of driver 212 when compared with the threshold elevation associated with driver 212.

Figure 2C:
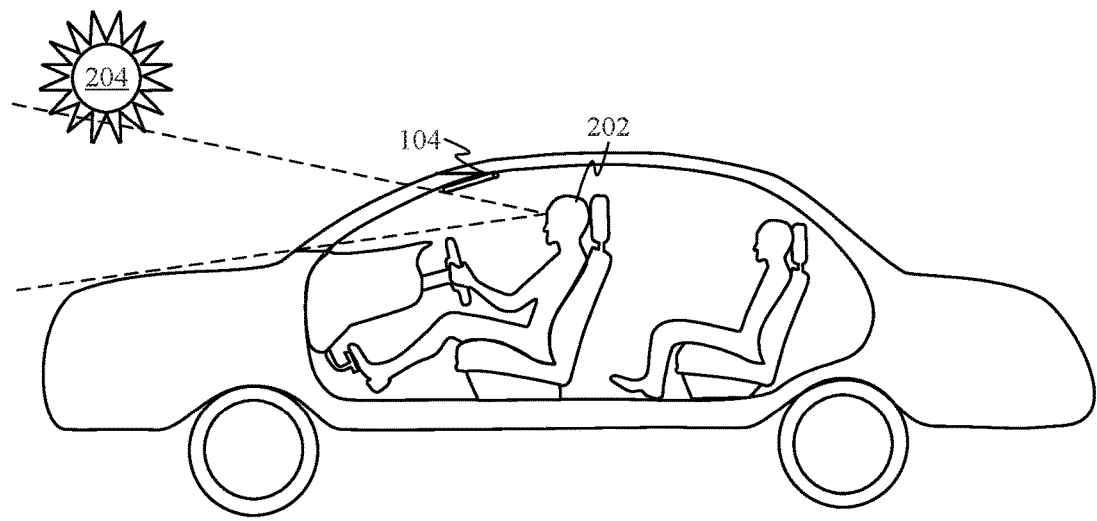
Figure 2D:
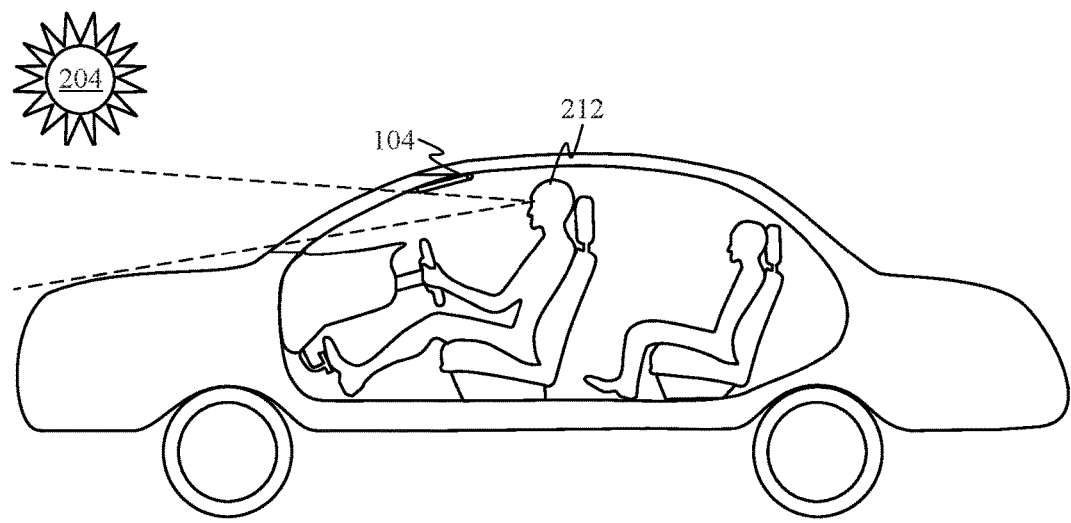

FIGS. 2C-2D show the effect on field of view of drivers 202 and 212 with sunshades 104 in a deployed position. In FIG. 2C, sunshade 104 shields driver 202 from direct view of sun 102. In FIG. 2D, sunshade 104 shields driver 212 from direct view of sun 102 as well as glare from certain reflections off interior surfaces of vehicle 100, etc. It should be appreciated that variations in the dimensions of the front windshield and in particular the height of the windshield height also change the elevation at which sun 102 begins to reduce the visual acuity of drivers 202 and 212.

Figure 3A:
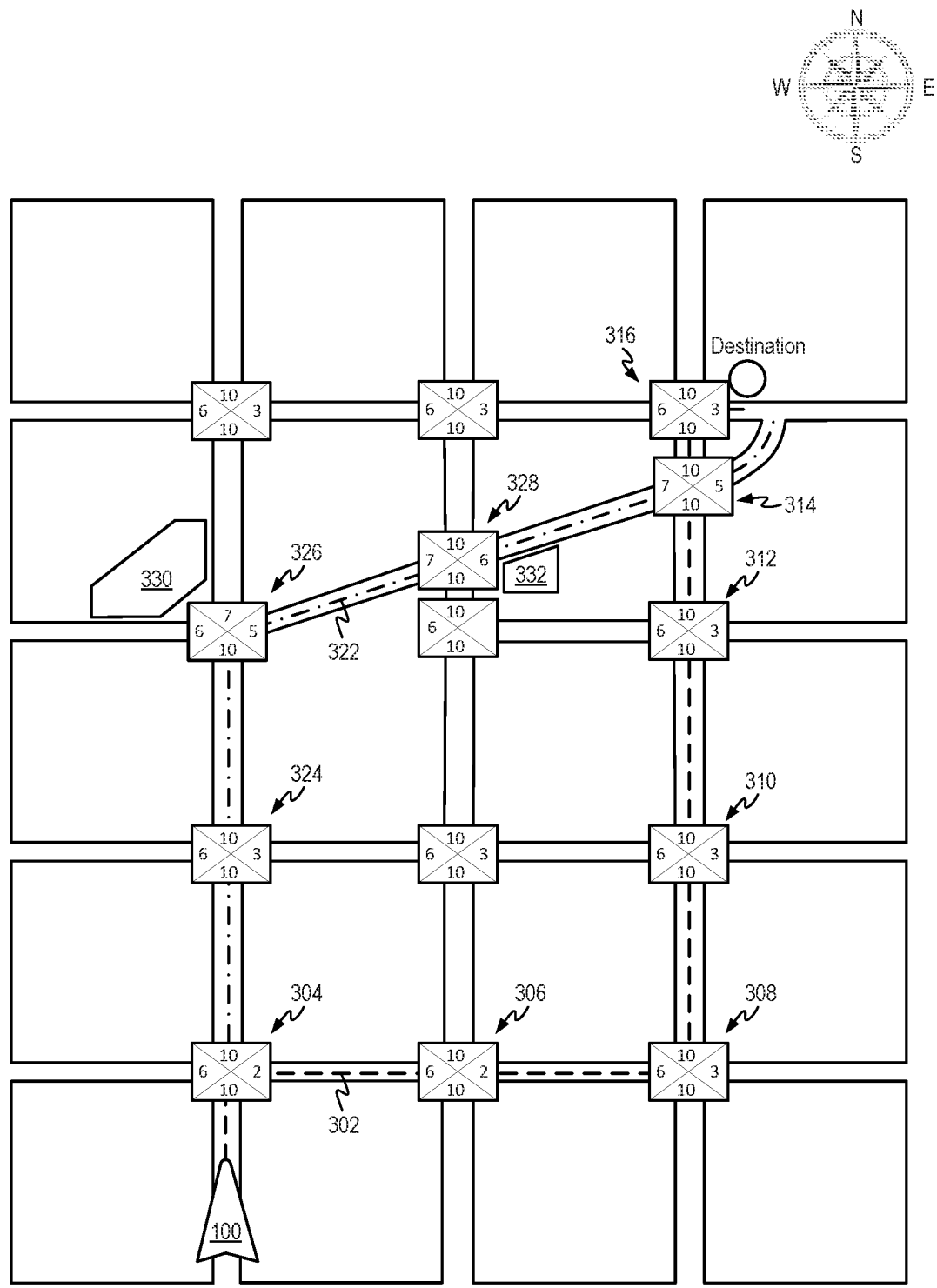
FIGS. 3A-3B show various routing schemes for maneuvering a vehicle around glare-prone areas.
Figure 3B:
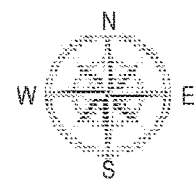
Figure 3B:
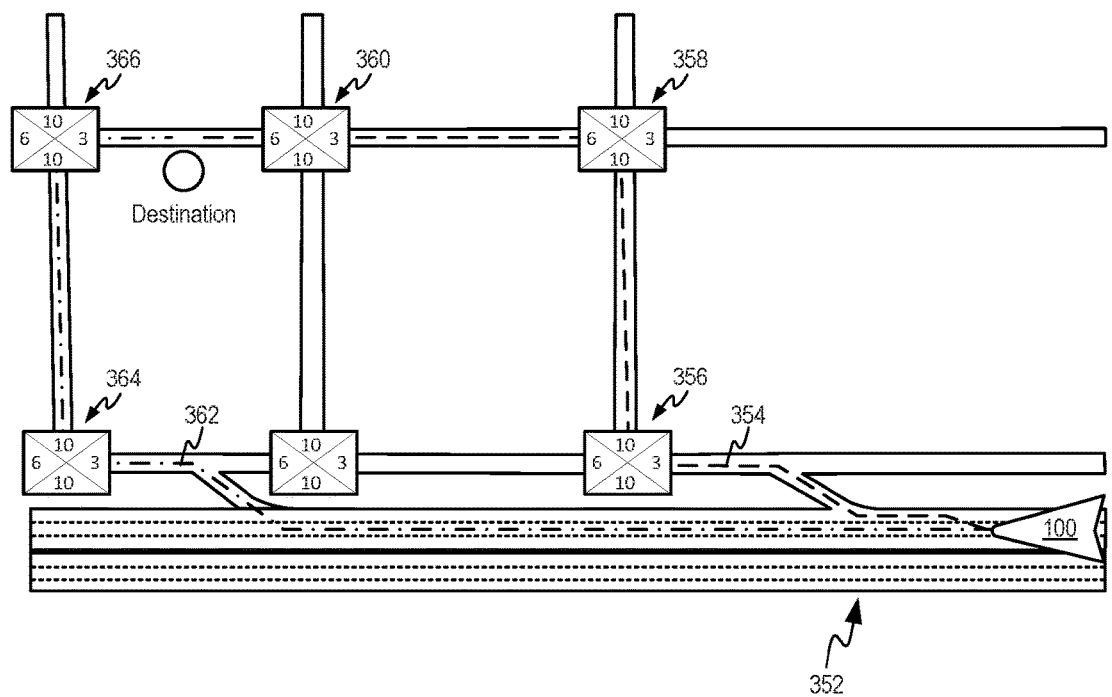

FIGS. 3A-3B show various routing schemes for maneuvering a vehicle around areas of potential glare. Each of the intersections depicted in FIGS. 3A-3B have been rated with a set of numbers indicating relative effect of glare when traversing the intersection at a particular day and time. The ten rating indicates little to no likelihood of glare and the one rating indicates the most severe levels of glare. These numbers can be based on a fusion of sun angle data and three dimensional terrain data. By fusing the sun angle and three dimensional terrain data, shadow regions can be identified that can reduce the effect of glare in particular areas. For example, tall office buildings surrounding an intersection could prevent most forms of glare from affecting visibility in the intersection. The glare ratings shown can be date and time dependent according to certain embodiments FIG. 3A shows a series of city blocks in a grid shaped arrangement of streets along with ratings for the depicted intersections during a morning commute in which the sun rises almost precisely in the East to align with the East/West oriented streets. Since the streets are oriented North/South or East/West, this makes any East/West oriented streets quite problematic in terms of potential glare, as indicated by the ratings. FIG. 3A depicts an initial route of travel 302 selected for vehicle 100. Route of travel 302 takes vehicle 100 through intersections 304, 306, 308, 310, 312 314 and 316. Unfortunately, this results in vehicle 100 having to drive through intersections 306 and 308 with glare ratings of 2 and 3 respectively. The rating of intersection 308 can be slightly higher than 306 on account of vehicle 100 arriving at intersection 308 later than intersection 306, resulting in the sun being slightly higher in the sky and less likely to obscure the vision of the driver of vehicle 100 while traversing intersection 308. Given the low glare ratings for both of intersections 306 and 308 a navigation system associated with vehicle 100 can be configured to select a different route of travel.

FIG. 3A also shows route of travel 322 selected by the navigation system of vehicle 100 after determining route 302 forced vehicle 100 to traverse high glare intersections 306 and 308. Route of travel 322 includes intersection 304, 324, 326, 328 and 314. The first sun glare improvement tactic utilized by the navigation system was to travel North/South before travelling West into the sun. This can be helpful in the morning as in heavy traffic this would give the sun additional time to rise higher above the horizon. Furthermore, intersections 304 and 324 both have 10 ratings travelling North. The lower seven rating at intersection 326 can be caused by sun glare reflected off building 330. In some embodiments, sun glare off a building can be modeled, e.g., based on a high definition map of the region including precise location and dimensions of structures such as buildings. The modeling of direct and reflected glare can be performed at the vehicle and/or at a system remote from the vehicle, e.g., at a cloud server. Alternatively or additionally, direct and reflected glare information can be crowd-sourced, e.g., based on real-time or historic transmission of information regarding sensor readings of other vehicles travelling the same route and/or in the vicinity. In the present case, a rating of seven can be considered acceptable. This is especially true given that vehicle 100 makes a right turn at intersection 326, which can generally be considered to be a safer maneuver than crossing through the intersection. Once vehicle 100 has turned in a northeasterly direction, the sun glare can be reduced on account of the sun shifting to the right side of the windshield. At intersection 328, the rating is a six rather than the five at intersection 326 on account of at least one of the traffic signals at intersection 328 being shaded from the sun by building 332. At intersection 314, vehicle 100 can continue straight through the intersection on account of that street placing vehicle 100 just east of the destination. By similar chains of logic, the navigational system can optimize other routes of travel in real-time to reduce the risk of reduced visibility due to sun glare.

FIG. 3B shows another example of re-routing a vehicle based on sun-glare during the evening hours when the sun is setting in the west. In this example, vehicle 100 is traversing highway 352 along route of travel 354, which takes vehicle 100 through intersections 356, 358 and 360. Due to the position of the sun in the West, intersections 356 and 360 have particularly bad sun glare. Intersection 360 is of particular concern on account of vehicle 100 needing to go straight through intersection 360. To avoid traveling straight through intersection 360 the navigation system of vehicle 100 can change route of travel 354 to a new route of travel 362, which routes vehicle 100 through intersections 364 and 366. Essentially the navigation system continues on highway 352, which does not have any traffic intersections, until one exit after the destination so westerly surface street travel is minimized. While intersection 364 does have a rating of three along the desired route, vehicle 100 is making a right turn. The right turn in this scenario can be safer on account of there being no incoming traffic cross-traffic since the intersection is a T-intersection. A protected right turn lane can also be helpful and in certain instances can be indicated and considered as part of the assessed intersection rating. In this way, route 362 allows vehicle 100 to avoid having to proceed straight through or make a left turn across an intersection having moderate to severe sun glare.

Figure 4:
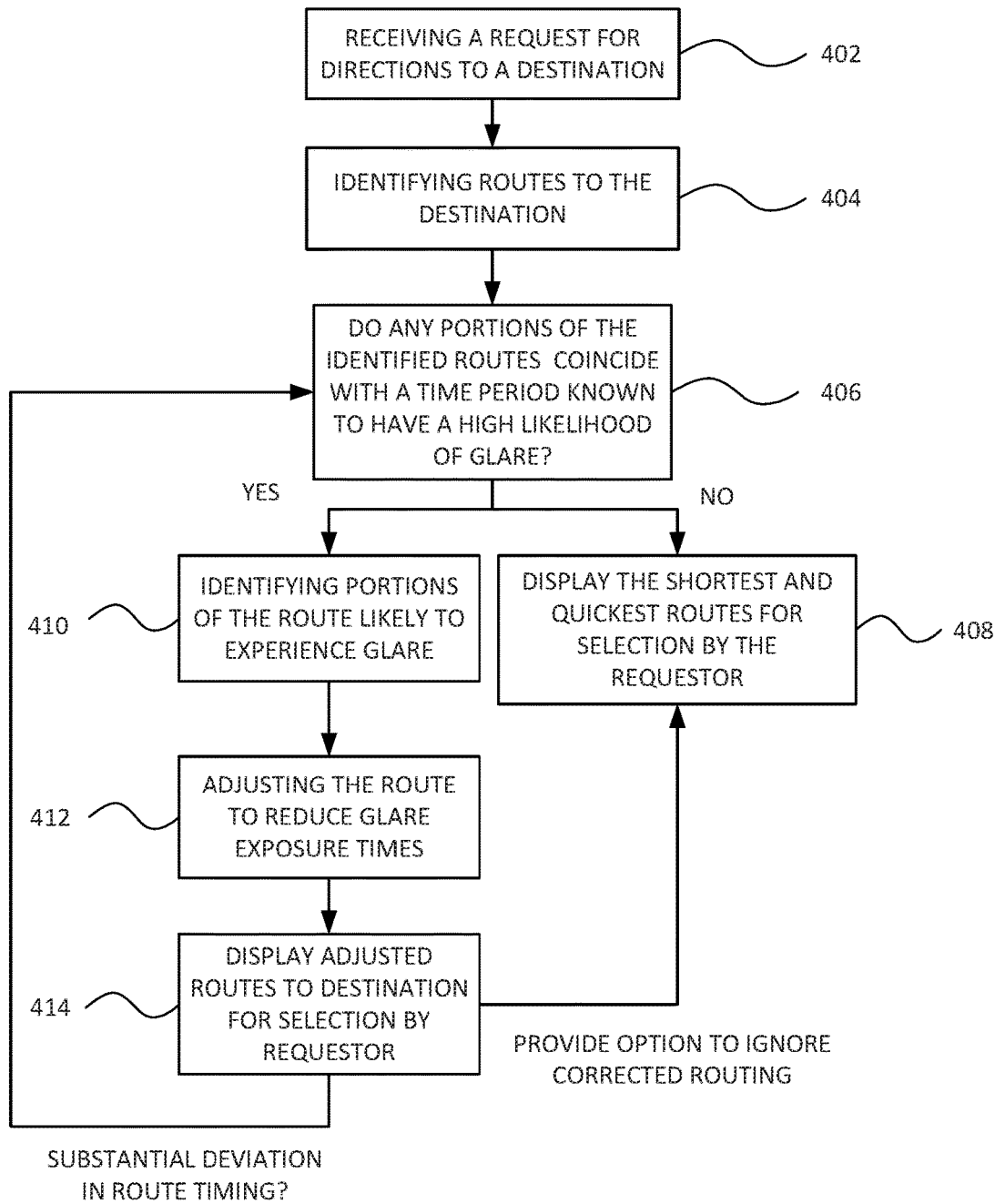
FIG. 4 shows a flow chart depicting a method for re-routing a vehicle to account for glare.

FIG. 4 shows a flow chart illustrating a method for re-routing a vehicle to account for glare. At 402, a request for directions to a destination is received. The request can be made in many ways including by manually typing in an address, selecting a destination by voice command and picking a destination from a list of previous destinations, etc. At 404, a navigation system can be configured to identify routes between the current location of the vehicle and the destination. In some embodiments, the routing can be setup between another starting point and the destination. This feature could be helpful for a traveler desiring to plan a trip later in the day or at some point in the future. At 406, the identified routes can be analyzed to see whether any portions of the routes are predicted to take place in periods of time where the sun is within a threshold number of degrees from the horizon. If no portion of the trip is determined to take place at any time where the sun is within, e.g., 30 degrees of the horizon, then the navigation system can simply display the identified routes without making any adjustments to the routing. Another situation in which additional glare identification processes could be avoided is where weather information indicates an overcast condition over the duration of the identified routes. In such a case, the additional glare identification processes can be skipped and route selection can be based entirely on more traditional criteria such as shortest or quickest route determinations.

At 410, when a portion of one of the routes is determined to take place during a period of time in which the sun is near the horizon and not blocked by any weather phenomenon, segments of the route likely to be affected by glare exposure can be identified. Identification of these segments can involve considering numerous factors. For example, glare experienced by a driver can be dependent upon the driver's position in the vehicle, the size, shape, and angle of the front windshield, the use of sunshades, the cleanliness of the front windshield, the position of adjacent structures capable of shading and/or reflecting bright sources of light such as the sun, etc. This will be discussed in greater detail in FIG. 5.

At 412, the navigation system can be configured to adjust the routing to reduce the severity of glare being experienced by a driver of the vehicle. Where the driver is an autonomous system, the glare can amount to glare incident to one or more sensors associated with the autonomous system. At 414, the navigation system can be configured to provide adjusted routing to the destination. In some embodiments, the driver can be given the option to ignore the routes corrected for sun glare in order to reduce driving time. In some embodiments, the driver can be apprised of the potential severity of the sun glare if a request to ignore the sun glare avoidance routing is requested. It should be noted that the system may make adjustments to respond to new conditions as they arise, e.g., when the route is delayed for some reason. For example, an unexpected stop at a gas station or heavier than expected traffic can lead to the vehicle being in a different location along the route, and thus position relative to the sun than originally calculated. Thus, appropriate adjustments can be made in real-time. When the route deviation exceeds a predetermined threshold such as, e.g., five minutes ahead or behind schedule, the method can return to 406 to determine whether the route needs to be further adjusted to accommodate changes in the position of the sun.

Figure 5:
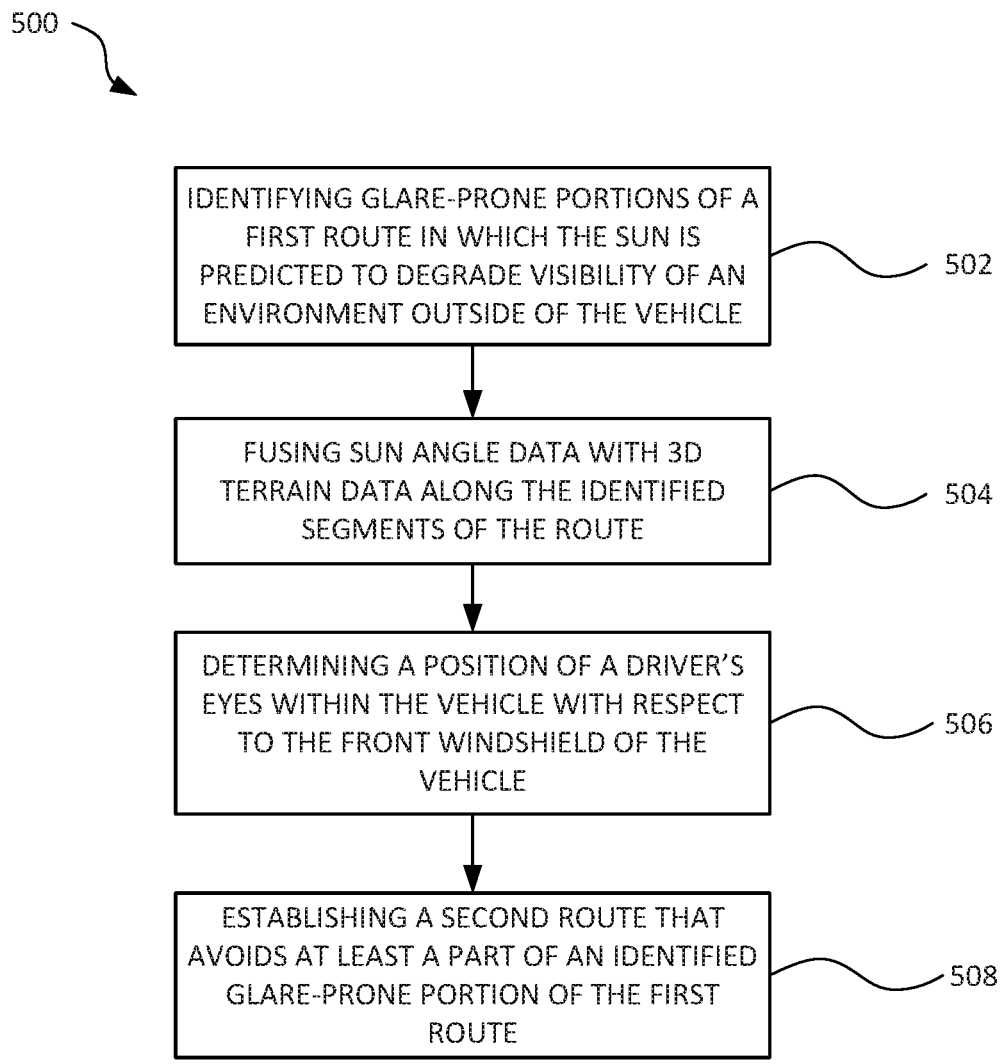
FIG. 5 shows a flow chart depicting a method for identifying glare-prone segments of a route.

FIG. 5 shows a flow chart 500 depicting a method for identifying glare-prone portions of a route. At 502, the navigation system identifies glare-prone portions of a first route in which the sun is predicted to degrade visibility of an environment outside of the vehicle. The degraded visibility prediction can be based on the position of the sun in the sky and the orientation of the vehicle with respect to the sun. In some embodiments, a portion of the route will only be considered to be glare-prone if the sun is positioned so that it is directly observable by the driver through the front windshield of the vehicle. At 504, sun position data can be fused with three-dimensional terrain data to identify shadowed areas within the identified glare-prone portions of the first route. For example, a large hill or building could mask significant portions of a road from the sun. The shadow data can be used to reduce the number of glare-prone portions associated with the first route FIG. 5 also shows how at 506, a sensor within the vehicle can be configured to monitor the position of the eyes of the driver within the cabin of the car. Alternatively, the navigation system can be configured to receive an input from the driver indicating an approximate position of the eyes of the driver with respect to the seat. The eye position data can be fused with information about the size, shape, angle, and/or location of the front windshield to help establish positions of the sun relative to the vehicle where the sun is likely to shine directly into the eyes of the driver. In some embodiments, the size and shape of the front windshield can be adjusted based on a position of each of the sunshades within the vehicle. In some embodiments, the vehicle can include a sensor configured to measure the cleanliness of the front windshield. The sensor can then determine whether the front windshield is dirty enough to increase the severity of sun glare. These factors can also be used to adjust which portions of the first route should be considered to be glare-prone.

At 508, a second route can be established that avoids at least a part of an identified glare-prone portion of the first route. In some embodiments, the second route can also factor the number of hazardous areas within a glare-prone portion of the first route in determining which glare-prone portions to avoid. In some embodiments, the hazardous areas can correspond to traffic intersections, school crosswalks and train crossings. In more rural areas, these hazardous areas could include areas known to have frequent livestock crossings, farm field entrances and unpaved narrow roads. In some embodiments, each type of hazardous area can have a threshold above which the navigation system will try to route the vehicle around it. For example, the navigation system can be configured to avoid any school crosswalks during the morning hours when the visibility falls below a predetermined threshold. In some embodiments, avoidance of or re-routing around a hazard area can be as simple as selecting a lane of a road less likely to be subject to strong glare. This could be possible where one or more lanes of a multi-lane road were masked from the sun by the shadow of a building or large terrain feature.

Figure 6:
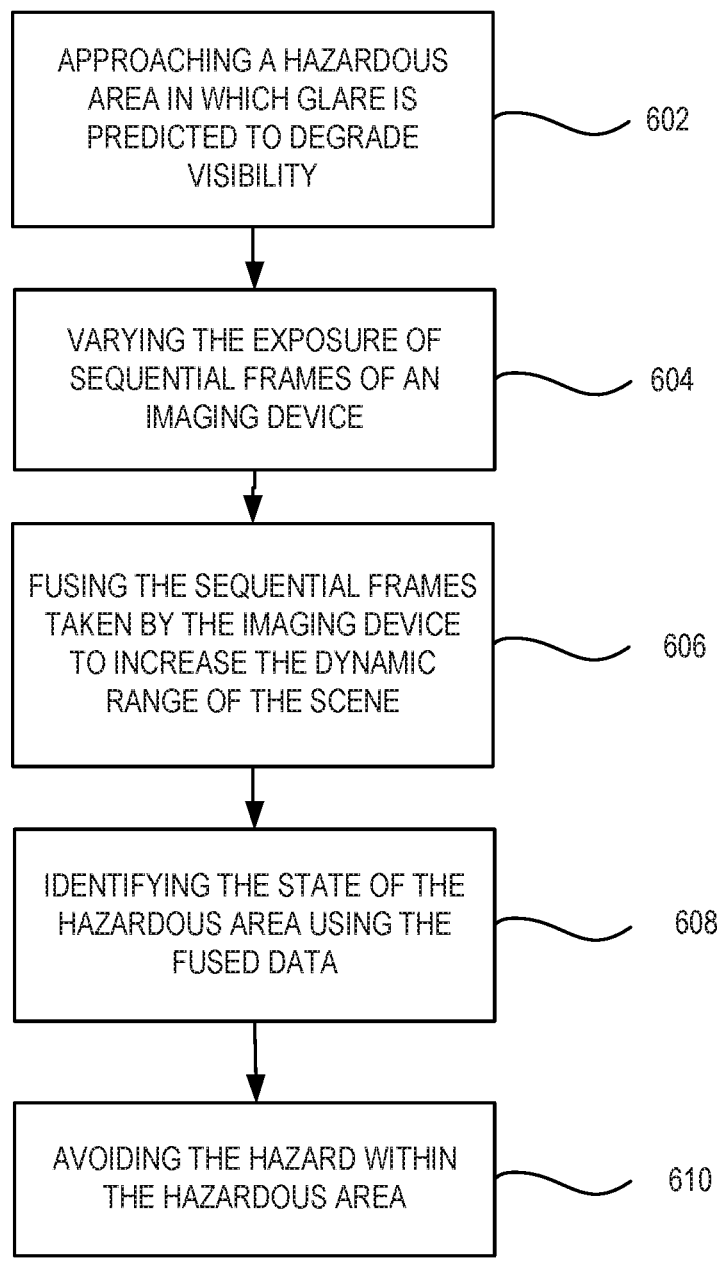
FIG. 6 shows a method for mitigating glare while traversing a glare-prone area.

FIG. 6 shows a flow chart depicting a method for mitigating glare in a hazardous area. At 602, a vehicle approaches a hazardous area in which the sun is predicted to adversely affect visibility. The navigation system and/or driver may have chosen this route to save time or because there was not another feasible way to avoid the hazardous area. As discussed above, a hazardous area could include a traffic signal or possibly be a crossing area that can include any number of people and/or animals. At 604, a sensor associated with the vehicle can be configured to capture a series of sequential frames at different exposure levels. In some embodiments, the vehicle can slow down to reduce blur in the sequential imagery frames and to reduce the likelihood of approaching the hazardous zone too quickly. In some embodiments, the imaging device used to record the sequential imagery frames can be configured to record the frames of imagery at a higher bit rate than usual. For example, the imagery can be recorded at 10 or 12 bits per pixel instead of at 8 bits per pixel. In some embodiments, this boosted bit rate can allow more shadow and highlight information to be recorded in each frame of imagery. At 606, the sequence of frames can be fused together to create a high dynamic range image or video capable of seeing more clearly through the high contrast scene created by the glare.

FIG. 6 also shows how at 608, the current state of the hazardous area can be characterized using the high dynamic range image or video. In some embodiments, machine code can be used to characterize the image or video. Where a driver is directing the movement of the vehicle, a viewing screen within the vehicle can be configured to display the high dynamic range image or video to the driver. In some embodiments, the computer characterization of the image or video can be used to warn the driver of certain hazards. For example, an indicator could be overlaid on the front windshield to cue the driver where to look for the hazard. At 610, the identified hazard can be avoided. Further, the vehicle could include safety protocols allowing the vehicle to stop or turn to avoid an identified hazard without affirmative input from the driver. For example, when the hazardous area is a traffic intersection and the analysis of the high dynamic range imagery is able to identify a red light, the vehicle could be configured to stop prior to entering a traffic intersection. It should be noted that while the description set forth herein generally references sun position, other bright sources of light tending to degrade driver visibility could also be avoided. For example, narrow roads known to have heavy traffic at night where drivers frequently use high beams could be indicated as hazardous glare areas. Furthermore, autonomous systems aboard other vehicles configured to report and identify dangerous glare areas could share data through a common cloud infrastructure. For example, strong stadium lighting could be identified and avoided.

Figure 7:
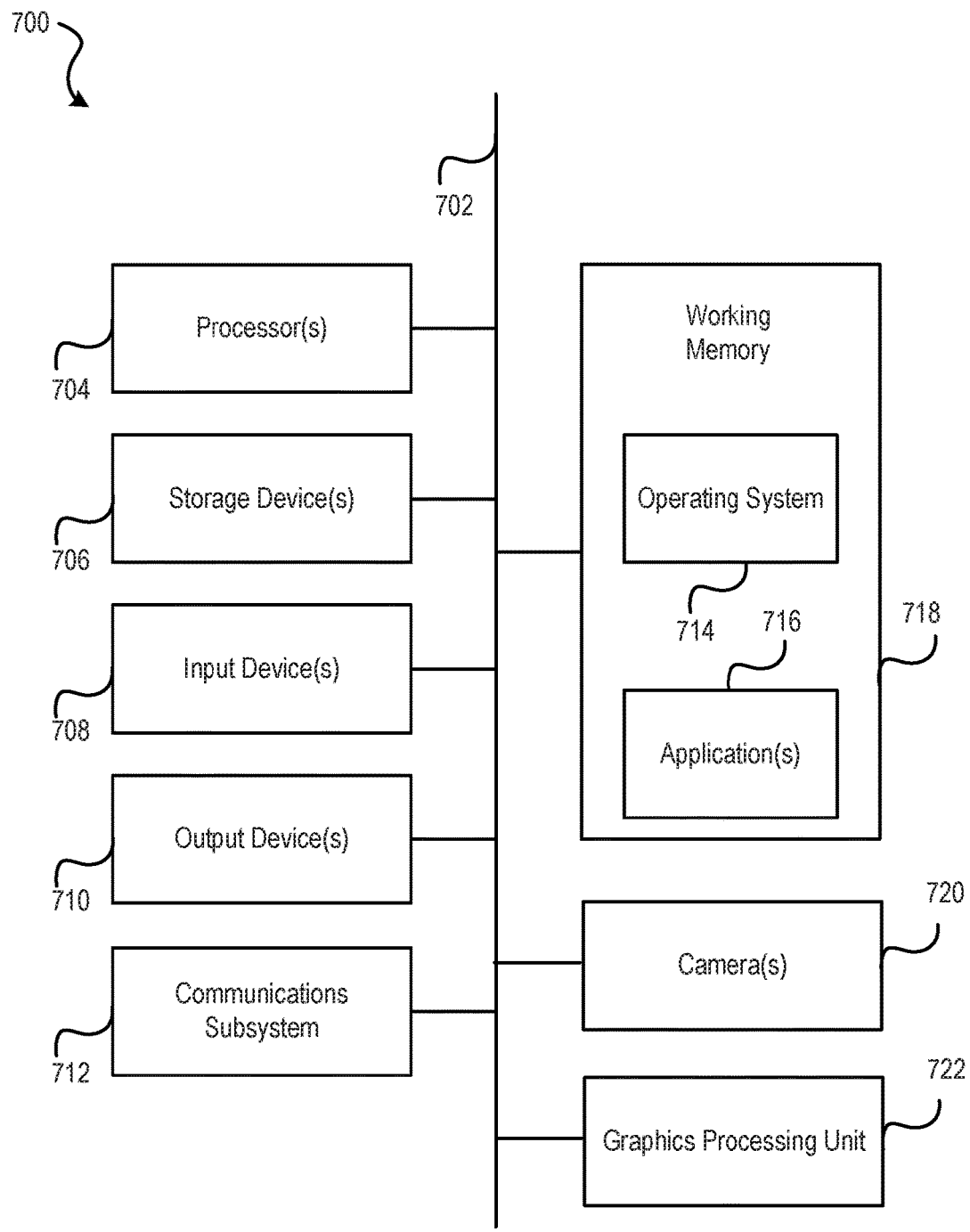
FIG. 7 illustrates an example of a computing system suitable for use with the described embodiments.

FIG. 7 illustrates an example of a computing system in which one or more embodiments may be implemented. A computer system as illustrated in FIG. 7 may be incorporated as part of the above described power control system. For example, computer system 700 can represent some of the components of a television, a computing device, a server, a desktop, a workstation, a control or interaction system in an automobile, a tablet, a netbook or any other suitable computing system. A computing device may be any computing device with an image capture device or input sensory unit and a user output device. An image capture device or input sensory unit may be a camera device. A user output device may be a display unit. Examples of a computing device include but are not limited to video game consoles, tablets, smart phones and any other hand-held devices. FIG. 4 provides a schematic illustration of one implementation of a computer system 700 that can perform the methods provided by various other implementations, as described herein, and/or can function as the host computer system, a remote kiosk/terminal, a point-of-sale device, a telephonic or navigation or multimedia interface in an automobile, a computing device, a set-top box, a table computer and/or a computer system. FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 702 (or may otherwise be in communication, as appropriate). The hardware elements may include one or more processors 704, including without limitation one or more general-purpose processors and/or one or more special-purpose processors (such as digital signal processing chips, graphics processing units 722, and/or the like); one or more input devices 708, which can include without limitation one or more cameras, sensors, a mouse, a keyboard, a microphone configured to detect ultrasound or other sounds, and/or the like; and one or more output devices 710, which can include without limitation a display unit such as the device used in implementations of the invention, a printer and/or the like. Additional cameras 720 may be employed for detection of user's extremities and gestures. In some implementations, input devices 708 may include one or more sensors such as infrared, depth, and/or ultrasound sensors. The graphics processing unit 722 may be used to carry out the method for real-time wiping and replacement of objects described above.

In some implementations of the implementations of the invention, various input devices 708 and output devices 710 may be embedded into interfaces such as display devices, tables, floors, walls, and window screens. Furthermore, input devices 408 and output devices 710 coupled to the processors may form multi-dimensional tracking systems.

The computer system 700 may further include (and/or be in communication with) one or more non-transitory storage devices 706, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 700 might also include a communications subsystem 712, which can include without limitation a modem, a network card (wireless or wired), an infrared communication device, a wireless communication device and/or chipset (such as a Bluetooth device, an 802.11 device, a Wi-Fi device, a WiMAX device, cellular communication facilities, etc.), and/or the like. The communications subsystem 712 may permit data to be exchanged with a network, other computer systems, and/or any other devices described herein. In many implementations, the computer system 700 will further comprise a non-transitory working memory 718, which can include a RAM or ROM device, as described above.

The computer system 700 also can comprise software elements, shown as being currently located within the working memory 718, including an operating system 714, device drivers, executable libraries, and/or other code, such as one or more application programs 716, which may comprise computer programs provided by various implementations, and/or may be designed to implement methods, and/or configure systems, provided by other implementations, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 706 described above. In some cases, the storage medium might be incorporated within a computer system, such as computer system 700. In other implementations, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which may be executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. In some implementations, one or more elements of the computer system 700 may be omitted or may be implemented separate from the illustrated system. For example, the processor 704 and/or other elements may be implemented separate from the input device 708. In one implementation, the processor may be configured to receive images from one or more cameras that are separately implemented. In some implementations, elements in addition to those illustrated in FIG. 4 may be included in the computer system 700.

Some implementations may employ a computer system (such as the computer system 700) to perform methods in accordance with the disclosure. For example, some or all of the procedures of the described methods may be performed by the computer system 700 in response to processor 704 executing one or more sequences of one or more instructions (which might be incorporated into the operating system 714 and/or other code, such as an application program 716) contained in the working memory 718. Such instructions may be read into the working memory 718 from another computer-readable medium, such as one or more of the storage device(s) 706. Merely by way of example, execution of the sequences of instructions contained in the working memory 718 might cause the processor(s) 704 to perform one or more procedures of the methods described herein.

The terms "machine-readable medium" and "computer-readable medium," as used herein, refer to any medium that participates in providing data that causes a machine to operate in a specific fashion. In some implementations implemented using the computer system 700, various computer-readable media might be involved in providing instructions/code to processor(s) 704 for execution and/or might be used to store and/or carry such instructions/code (e.g., as signals). In many implementations, a computer-readable medium may be a physical and/or tangible storage medium. Such a medium may take many forms, including but not limited to, non-volatile media, volatile media, and transmission media. Non-volatile media include, for example, optical and/or magnetic disks, such as the storage device(s) 706. Volatile media include, without limitation, dynamic memory, such as the working memory 718. Transmission media include, without limitation, coaxial cables, copper wire and fiber optics, including the wires that comprise the bus 702, as well as the various components of the communications subsystem 712 (and/or the media by which the communications subsystem 712 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 704 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various implementations of the invention.

The communications subsystem 712 (and/or components thereof) generally will receive the signals, and the bus 702 then might carry the signals (and/or the data, instructions, etc. carried by the signals) to the working memory 718, from which the processor(s) 704 retrieves and executes the instructions. The instructions received by the working memory 718 may optionally be stored on a non-transitory storage device 406 either before or after execution by the processor(s) 704.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Moreover, nothing disclosed herein is intended to be dedicated to the public.

While some examples of methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A vehicle, comprising:
a navigation system configured to: identify one or more glare-prone portions of a first route of travel in which at least one light source is predicted to degrade visibility of an environment outside of the vehicle, the prediction based on at least light source position information and predicted position and orientation of the vehicle along the first route of travel, and establish a second route of travel that avoids at least a part of an identified glare-prone portion of the first route of travel; and
a wireless signal receiver configured to receive a signal that includes information identifying glare-prone portions of the second route of travel and to send the information to the navigation system, wherein establishing the second route further takes into account the wirelessly received glare information.

2. The vehicle as recited in claim 1, further comprising: an imaging device configured to collect imagery of the environment outside of the vehicle, wherein the imaging device is configured to capture multiple frames of imagery at different exposure levels and then fuse the frames together to obtain a high dynamic range image in response to light reaching a light meter associated with the imaging device exceeding a threshold value.

3. The vehicle as recited in claim 1, further comprising: a front windshield; and
a light filter covering at least a portion of the front windshield and being configured to reduce the amount of light entering the vehicle through the front windshield, wherein the navigation system is configured to adjust a threshold at which the navigation system identifies a portion of the first route of travel as being a glare-prone portion in accordance with the strength of the light filter.

4. The vehicle as recited in claim 1, further comprising: a front windshield; and
a sensor configured to characterize the cleanliness of the front windshield, wherein the navigation system is configured to adjust a threshold at which the navigation system identifies a portion of the first route of travel as being a glare-prone portion in accordance with the cleanliness of the front windshield.

5. The vehicle as recited in claim 1, wherein the light source position information comprises sun position information.

6. A method for navigating a vehicle, comprising:
identifying one or more glare-prone portions of a first route in which the sun is predicted to degrade visibility of an environment outside of the vehicle, the prediction based on at least sun position information and predicted position and orientation of the vehicle along the first route; and establishing a second route that avoids at least a part of an identified glare-prone portion of the first route; and
wherein identifying one or more glare-prone portions of the route comprises:
ignoring portions of the first route along which the vehicle is predicted to traverse while the sun is a threshold distance above the horizon; and
identifying one or more portions of the first route during which the vehicle is predicted to be pointed within a threshold number of degrees from the sun.

7. The method as recited in claim 6, wherein the threshold distance above the horizon is established in accordance with a position of the eyes of a driver within the vehicle.

8. The method as recited in claim 6, wherein the threshold distance above the horizon is established in accordance with a position of a sunshade disposed within the vehicle.

9. The method as recited in claim 6, wherein the threshold distance above the horizon is established in accordance with a cleanliness of the front windshield.

10. The method as recited in claim 6, wherein identifying one or more glare-prone portions of the first route comprises receiving a signal from a wireless transmitter that includes information indicating the sun is degrading visibility of drivers in other vehicles in one or more portions of the route, and wherein the second route avoids one or more portions of the route indicated by the information in the signal.

11. The method as recited in claim 6, wherein establishing a second route comprises: identifying traffic intersections within the glare-prone portions of the first route; evaluating the severity of degraded visibility at each identified traffic intersection, wherein the second route avoids one or more of the identified traffic intersections in which the sun is predicted to degrade visibility of a traffic intersection by a predetermined amount.

12. The method as recited in claim 6, wherein the method further comprises capturing multiple frames of imagery with an optical sensor at different exposures and fusing the frames of imagery together to overcome imaging limitations caused by the sun being within a field of view of the optical sensor.

13. A vehicle, comprising:
one or more processors;
a non-transitory computer-readable storage medium containing instructions configured to cause the one or more processors to perform operations including:
receiving a request to navigate the vehicle to a destination;
determining a first route between a current location of the vehicle and the destination;
determining a predicted start and stop time for the first route;
identifying one or more glare-prone portions of the first route in which one or more light sources are predicted to degrade visibility of an environment outside of the vehicle, the prediction based on at least light source position information and predicted position and orientation of the vehicle along the first route; and establishing a second route that avoids at least a part of an identified glare-prone portion of the first route; and
wherein a driver's position within the vehicle and dimensions of the vehicle are used to more accurately predict when the one or more light sources are likely to be degrade visibility of an environment outside the vehicle through a front windshield of the vehicle.

14. The vehicle as recited in claim 13, wherein the part of an identified glare-prone portion of the first route avoided by the second route includes a hazardous area.

15. The vehicle as recited in claim 14, wherein the hazardous area comprises a road intersection.

16. The vehicle as recited in claim 13, wherein the road intersection is identified as being a hazardous area on account of the sun being predicted to reflect off multiple lights of a traffic signal, thereby obscuring which traffic signal is active.

17. The vehicle as recited in claim 13, further comprising; a windshield, a portion of the windshield including a layer of polarized glass; and an imaging device configured to record imagery through the portion of the windshield including the layer of polarized glass.

* * * * *